(12) United States Patent
Lemser et al.

(10) Patent No.: US 8,613,296 B2
(45) Date of Patent: Dec. 24, 2013

(54) TIRE INFLATING STATION AND METHOD FOR INFLATING TIRES

(75) Inventors: Matthias Lemser, Weiterstadt (DE); Andreas Peinelt, Pfungstadt (DE)

(73) Assignee: Schenck RoTec GmbH, Darmstadt (DE)

( * ) Notice: Subject to any disclaimer, the term of this patent is extended or adjusted under 35 U.S.C. 154(b) by 742 days.

(21) Appl. No.: 12/924,731

(22) Filed: Oct. 4, 2010

(65) Prior Publication Data

US 2011/0100502 A1    May 5, 2011

(30) Foreign Application Priority Data

Oct. 30, 2009 (DE) .......................... 10 2009 046 195

(51) Int. Cl.
*B65B 31/00* (2006.01)

(52) U.S. Cl.
USPC ............. 141/38; 141/164; 141/177; 141/181; 141/367; 137/223; 157/1.17; 157/1.26

(58) Field of Classification Search
USPC .................. 141/38, 164, 181, 284, 177, 367; 137/223; 157/1, 1.1, 1.17, 1.24, 1.26, 157/1.28

See application file for complete search history.

(56) References Cited

U.S. PATENT DOCUMENTS

| | | | |
|---|---|---|---|
| 6,467,524 B2 | 10/2002 | Ronge et al. | |
| 7,506,671 B2 | 3/2009 | Peinelt et al. | |
| 2009/0145518 A1* | 6/2009 | Hoenke | 141/371 |

FOREIGN PATENT DOCUMENTS

| | | |
|---|---|---|
| EP | 1 110 765 | 6/2001 |
| EP | 1 125 772 | 8/2001 |
| EP | 1 671 820 | 6/2006 |

* cited by examiner

*Primary Examiner* — Jason K Niesz
(74) *Attorney, Agent, or Firm* — Collard & Roe, P.C.

(57) ABSTRACT

In a tire inflating station for inflating a tubeless tire arranged on a rim with a pressurized gas, arranged on a stand are a conveyor for receiving and conveying a wheel consisting of a wheel rim and a tire mounted on the wheel rim, and an inflation device above the conveyor and having an inflation opening which can be connected to a gas supply. The lower side of the inflation device has a carrier plate that is mounted to move backwards and forwards along an axis between at least two positions in a straight-line mechanism. There are inflation rings attached in tandem in a gas-tight manner to the lower side of a carrier plate. Inside the inflation rings, the carrier plate has a respective continuous opening. In each of the different working positions of the carrier plate, another of the continuous openings is connected to the inflation opening of the inflation device, which inflation opening is arranged on the upper side of the carrier plate.

10 Claims, 1 Drawing Sheet

TIRE INFLATING STATION AND METHOD FOR INFLATING TIRES

CROSS REFERENCE TO RELATED APPLICATIONS

Applicants claim priority under 35 U.S.C. §119 of German Patent Application No. 10 2009 046 195.7 filed Oct. 30, 2009.

BACKGROUND OF THE INVENTION

1. Field of the Invention

The invention relates to a tire inflating station and a method for inflating a tubeless tire arranged on a rim with a pressurized gas, comprising a stand, a conveying means which arranged on the stand for receiving and further conveying a wheel consisting of a wheel rim and a tire mounted on the wheel rim, an inflation device arranged above the conveying means and having an inflation opening which can be connected to a gas supply, and at least two inflation rings of different diameters which are configured to enter into sealing engagement with the upper side face of the tire of a wheel arranged lying under the inflation device. There is also a bearing means which has a sealing surface which cooperates with the lower side face of the tire and on which the wheel rests while it is being inflated.

2. The Prior Art

In automatic series production, motor vehicle wheels with tubeless tires are usually filled with compressed air in an automatic tire inflating station which is integrated into the assembly line. In this procedure, the rim with mounted tire is positioned on a suitable supporting plate which downwardly seals the wheel during the inflation procedure. Positioned on the upper side of the tire is an inflation bell which upwardly seals the tire and the rim and by which the side wall of the tire is pressed downwards to such an extent during inflation that an annular gap is produced between tire bead and rim through which the compressed air guided into the inflation bell can flow into the tire. The compressed air that has flowed in presses the tire forcibly against the supporting plate and the inflation bell. When the inflation pressure has been reached, the inflation bell is lifted, causing the sidewalls of the tire to move apart in an axial direction until the tire beads have assumed their respective fit position on the rim. For an inflation procedure of this type, the inflation bell must have an opening the diameter of which is on the one hand large enough that the inflation bell does not abut against the rim, but can be put over the rim. However, on the other hand, the diameter of the opening must not be so large that the inflation bell contacts the upper sidewall of the tire radially outside its high point. Should this happen, the inflation bell would obstruct the radial movement of the tire which could result in the tire bead not jumping correctly into its seat. Thus, an inflation bell is only suitable for a limited range of motor vehicle wheel sizes.

In order to broaden the size range of tires to be inflated in the same tire inflating station, a tire inflating station described in European Patent No. EP 1 125 772 B1 of the type mentioned at the outset has a tire inflation bell with two inflation rings of different diameters, the smaller or larger inflation ring being used depending on the size of the tire. The two inflation rings are arranged telescopically one inside the other, and the inner ring can be adjusted relative to the outer ring in a fluid-actuated manner. The known tire inflation bell requires a relatively large axial overall length.

European Patent No. EP 1 110 765 B1 discloses an inflation bell with three inflation rings arranged one inside the other. In addition to a large axial overall length, this configuration also involves quite considerable construction costs.

Furthermore, European Patent Application No. EP 1 671 820 A2 discloses a tire inflating station with a tire inflation bell, which tire inflation station comprises an inflation plate that can be moved along the axial line of the wheel and a plurality of separate inflation rings of different diameters which can be moved into a central position relative to the axial line, it being possible to move the inflation plate towards the side face of a tire to be inflated together with an inflation ring which has moved into the central position. The inflation rings are secured to holders of a movement means and can be moved thereby on a circular curve into the central position and axially. This known arrangement too is relatively expensive.

SUMMARY OF THE INVENTION

The object of the invention is to provide a tire inflating station of the specified type which is suitable for a large range of different tire sizes and can be produced in a cost-effective manner. The tire inflating station should allow high inflation accuracy, be reliable and require little maintenance. A further object of the invention is to provide an advantageous method for inflating tires.

The object is achieved according to the invention by a tire inflating station that comprises an inflation device with a carrier plate which is arranged on the lower side thereof and is mounted such that it can move backwards and forwards along an axis between at least two positions in a straight-line mechanism. There are inflation rings, seen in the direction of movement, that are attached in a gas-tight manner in tandem on the lower side of the carrier plate. The carrier plate has a respective continuous opening inside the inflation rings and, in each of the at least two positions of the carrier plate, one of the continuous openings is connected to the inflation opening of the inflation device which inflation opening is arranged on the upper side of the carrier plate.

The tire inflating station according to the invention is characterized by a simple, robust construction which allows it to be produced in a cost-effective manner. Instead of a plurality of inflation bells, a single, linearly displaceable member with a plurality of inflation rings is provided which can be guided and mounted at little expense and can be moved into the different working positions by a cost-effective, linear drive. The seal of the inflation ring connections with respect to the inflation opening of the inflation device can also be configured in a simple and economical manner. Control of the inflation pressure is not affected when the inflation ring is replaced.

If, according to a further proposal of the invention, the carrier plate of the tire inflating station is arranged such that it can be moved in the conveying direction of the transportation means, the further advantage of a small space requirement is provided, since the necessary movement space for the carrier plate is then located above the conveying means and does not require any additional space at the side next to the tire inflating station.

A further proposal of the invention provides that the inflation device is rigidly connected to the stand and the bearing means can be moved up to the inflation device. The advantage of this configuration is that no movable connections are required for the supply of air and the forces which arise during the inflation of a tire can be effectively dissipated. Thus, for example the carrier plate can be supported with its upper side against a counter bearing plate which is attached to the stand and serves as a base for the components of the inflation device.

According to a further proposal of the invention, the movement of the bearing means can be achieved by a plurality of preferably pneumatic lifting cylinders which are arranged on the stand and by which the bearing means can be moved in a preferably vertical direction, perpendicular to its sealing surface. An additional hydraulic brake cylinder supports the high forces acting on the bearing means and transfers them over a short distance to the stand. The bearing means preferably has a supporting plate with a planar supporting surface that forms at least part of the sealing surface.

A further proposal of the invention provides that the conveying means has conveyor belts which are positioned in grooves in the upper side of the supporting plate when the bearing means is moved towards the inflation device, the conveyor belts in the grooves tightly sealing the grooves and forming with their upper side a second part of the sealing surface. This configuration achieves in a simple manner a sealing of the tire on the side opposite the inflation ring. Since the supporting plate is undivided, it can be configured in a very robust and distortion-resistant manner. Expensive guides and drive means for moving divided receiving plates apart can be dispensed with.

According to the invention, the conveyor belts are guided on both sides of the supporting plate via deflection rollers, it being possible at least for the deflection rollers on the entry side of the conveying means to be moved transversely to the supporting surface of the supporting plate from a first position, in which the conveyor belts are positioned in the grooves in the upper side of the supporting plate, into a second position, in which the conveyor belts emerge from the grooves to allow the conveying of a wheel. Of course, the deflection rollers can also be jointly mounted on both sides of the supporting plate in a frame that can be moved into the two positions with respect to the supporting plate.

In order to center a wheel conveyed into the tire inflating station in respect of the axis of the inflation ring arranged in the working position, the tire inflating station can furthermore have a centering device, which has a centering pin that engages in the receiving hole in the rim of the wheel. The centering device with centering pin can be arranged in the inflation device or on the bearing device, the centering pin entrance being sealed off.

BRIEF DESCRIPTION OF THE DRAWINGS

In the following, the invention is described in more detail with reference to an embodiment which is illustrated in the drawings, in which.

DETAILED DESCRIPTION OF THE PREFERRED EMBODIMENT

Figure 1:
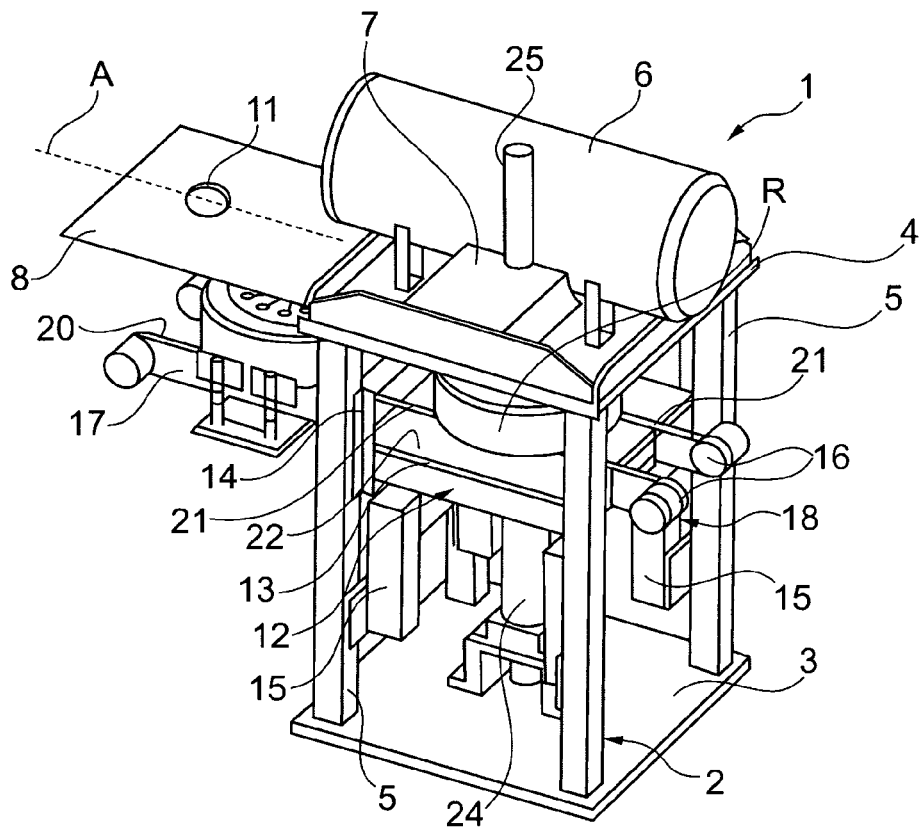
FIG. 1 is a perspective view of a tire inflating station according to the invention.

The tire inflating station 1 shown in the drawing has a stand 2 with a rectangular base plate 3 and a rectangular top plate 4 which are rigidly interconnected at their corners by four columns 5. Arranged on the top plate 4 are an air tank 6 and an inflation device 7, which has an inflation opening penetrating the top plate 4 and valves by which the inflation opening can be connected to the air tank 5 or to the atmosphere. A carrier plate 8 is mounted displaceably along an axis A parallel to the side edges of the top plate 4 on the lower side of the top plate 4 in a straight-line mechanism. In the direction of axis A, the carrier plate 8 has a length greater than that of the top plate 4. Its width is calculated such that it can be moved between the columns 5.

Positioned in tandem on the lower side of the carrier plate 8, seen in the longitudinal direction, are three inflation rings 9a, 9b, 9c of different diameters. The inflation rings 9a, 9b, 9c are arranged with spacing from one another and their center axes respectively intersect the longitudinal center axis of the carrier plate 8. The inflation rings 9a, 9b, 9c are attached in a gas-tight manner to the carrier plate 8 and form with their lower edge, which faces away from the carrier plate 8, a narrow, annular sealing surface 10. The carrier plate 8 has in the center of each of the inflation rings 9a, 9b, 9c a respective continuous, circular opening 11 which is connected to the inflation opening of the inflation device 7 when the inflation ring surrounding the opening 11 is in the working position underneath the inflation device 7. The necessary seal between the opening 11 and the inflation opening of the inflation device 7 can be achieved by means of a sealing ring which surrounds the inflation opening on the inflation device 7 and rests on the edge, surrounding the opening 11, on the upper side of the carrier plate 8. The sealing ring can be configured such that its contact pressure on the carrier plate 8 increases when the pressure inside the inflation opening and the opening 11 exceeds the external ambient pressure.

Arranged in the stand 2 underneath the carrier plate 8 with the inflation rings 9a, 9b, 9c is a bearing means 12 on which a wheel R with a tire to be inflated is mounted during the inflation procedure. The bearing means 12 has a planar supporting plate 13 which is reinforced by a frame and which is guided such that it can move vertically in guides 14 on the columns 5. The supporting plate 13 is supported by four lifting cylinders 15 which are arranged parallel to the columns 5 under the supporting plate 13 and are attached to the columns 5. To move the supporting plate 13, the lifting cylinders 15 are connected to a pneumatic control means by which their pistons can be displaced in a unidirectional movement. The bearing means can be locked by a hydraulic brake cylinder 24 in the respective lift position in which the bearing means is located. The brake cylinder 24 is arranged standing in the center of the base plate 3 and its piston rod is supported on and secured to the lower side of the supporting plate 13. The locking action is produced by pneumatically controlled valves, which close the supporting cylinder chambers to effect locking.

The drawing shows the supporting plate 13 in the lowest position, which is intended for loading and unloading the tire inflating station 1. The spacing between the supporting plate 13 and the inflation rings 9a, 9b, 9c in the lowest position is calculated to be of such a size that the various wheel sizes which are to be processed in the tire inflating station can be supplied and removed after processing in an unhindered manner.

The tire inflating station 1 has conveying means 17, 18 for supplying and removing the wheels to be processed. The conveying means 17 is arranged on the supply side upstream of the supporting plate 13 and is attached to the stand by cantilever arms 19. The conveying means 17 has two parallel conveyor belts 20 which extend in a plane substantially parallel to the supporting plate 13 in the direction of the supporting plate 13. The conveying means 18 is joined to conveying means 17 with an overlap and extends behind the removal-side end of the supporting plate 13. It has two parallel conveyor belts 21 which extend beyond the supporting plate 13 and are guided over deflection rollers 16 on both sides of the supporting plate 13. In the region of the conveyor belts 21, the supporting plate 13 provided with grooves in which the conveyor belts 21 can be inserted. The conveying means 18 is mounted such that it can move vertically on the supporting plate 13 and can be moved together with the supporting plate 13. Furthermore, the conveying means 18 can be moved into two different positions relative to the supporting plate 13, that is, into a first position in which the conveyor belts 21 are positioned in grooves on the upper side of the supporting plate 13, and into a second position in which the conveyor belts 21 are raised and partly or completely emerge from the grooves in the supporting plate 13. In the second position, the conveying means 18 can receive a wheel supplied by the conveying means 17, convey it into the working position in the center of the supporting plate 13 and, at the end of the inflation procedure, convey it out of the tire inflating station on the removal side to a further conveying means. The first position of the conveying means 18 is intended for performing the inflation procedure. In this position, the conveyor belts 21 are located fully in the grooves in the supporting plate 13, tightly sealing the grooves and forming with their upper side planar surfaces which substantially seamlessly complete the planar surface of the supporting plate 13, which surface is interrupted at the grooves. Thus, the receiving plate 13 and the conveyor belts 21 form with their upper sides in this position of the conveying means 18 a continuous, planar sealing surface 22 by which the tire of a wheel R resting on the supporting plate 13 is sealed on the lower supported side wall.

The bearing means 12 also has centering means by which the wheel R to be processed can be brought into a predetermined, central position on the supporting plate 13. To center the wheel, pivoting arms (not shown) which engage at a plurality of points on the tread of the tire are arranged in a known manner on both sides of the supporting plate 13. In addition, the tire inflating station 1 has a centering means 25 for centering the rim. The centering means 25 is arranged centrally in the inflation device 7 and has a cylinder with a downwardly extending piston rod which bears a centering pin on its end. The centering pin is guided such that it can move lengthwise in a hole in the top plate 4 and is sealed therein.

Figure 2:
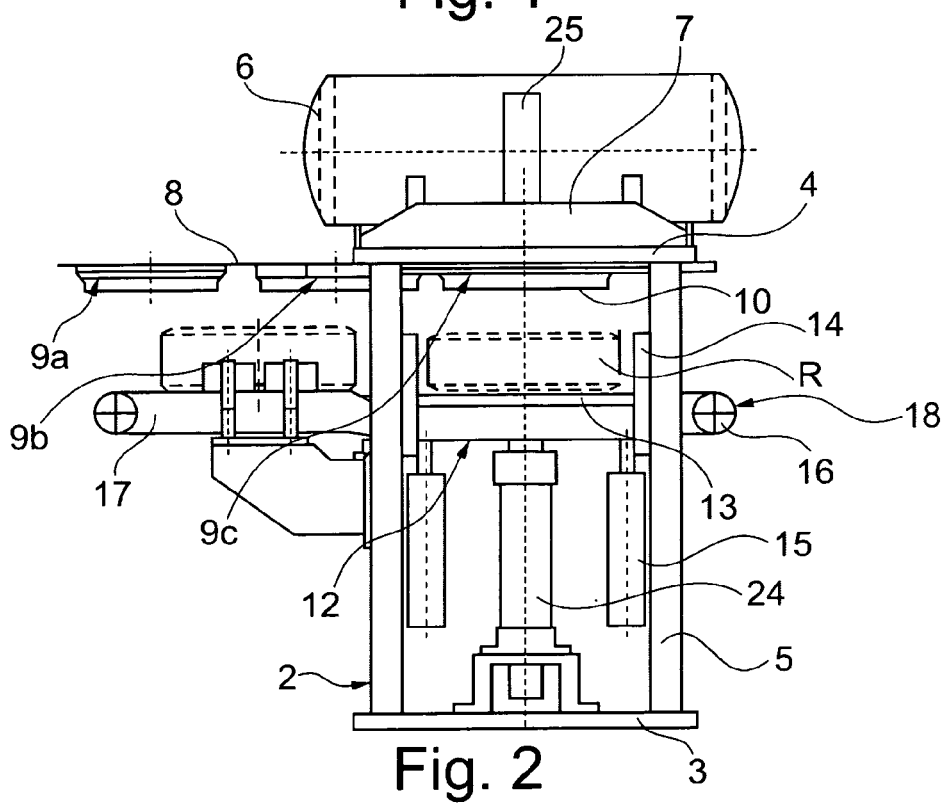
FIG. 2 is a side view of the tire inflating station according to FIG. 1.

The tire inflating station 1 is primarily intended for use in an assembly line on which tires and rims of different sizes are produced and ready-for-use wheels are assembled. In this case, the tire inflating station 1 is supplied with pre-assembled wheels, consisting of a wheel rim and a tubeless tire drawn onto the rim. During the supply of a wheel R of this type, the tire inflating station 1 is in the position shown in FIGS. 1 and 2, with a lowered bearing means 12 and the conveying means 18 in the second position. The wheel R is transferred to the conveying means 17 by a conveying means (not shown) and transported into the center of the supporting plate 13 by the conveying means 17, 18. When the wheel R has reached this position, the conveying means 18 is lowered into the first position with respect to the supporting plate 13, as a result of which the conveyor belts 21 are positioned in the grooves in the supporting plate 13 and rim and tire of the wheel R come into contact with the sealing surface 22 formed by the supporting plate 13 and the conveyor plates 21.

The tire size of the supplied wheel can either be provided rigidly to the control means of the tire inflating station 1 in advance or can be forwarded in each case by the previous station. Alternatively, it is also possible for measuring means for detecting the tire size of the wheel to be inflated to also be provided at the tire inflating station 1. Depending on the tire size of the supplied wheel, the inflation ring 9a, 9b, 9c which fits the tire size is moved into the working position before the start of the inflation process by moving the carrier plate 8. In the drawing the inflation ring 9c is in the working position.

When the tire and rim are resting on the sealing surface 22, first of all the wheel is centered by four centering arms and then the rim is centered by the centering pin. To inflate the tire, the supporting plate 13, together with the conveying means 18 is then raised until the inflation ring 9c rests with its sealing surface 10 against the upper side wall of the tire and presses the upper side wall in to such an extent that there is an annular gap between the upper tire bead and the rim which is sufficient for inflation and through which the supplied air can pass into the interior of the tire. The suitable immersion depth of the inflation ring 9c is controlled automatically by a displacement transducer as a function of the inflation characteristics of the tire to be inflated and the associated rim. The brake cylinder 24 is blocked. Inflation then takes place in that the inflation opening of the inflation device 7 is connected to the air tank 6 by activating a valve. The air passes out of the inflation opening, through the opening 11 connected thereto, into the space sealed off from the surroundings by the carrier plate 8, the inflation ring 9c, the tire wall and the supporting plate 13 and into the interior of the tire via the annular gap between tire bead and tire rim. When the desired inflation pressure is achieved, which is measured in a suitable location of the inflation device 7, then, by a controlled lowering movement of the supporting plate 13 including the conveying means 18, the upper tire bead and, if this has not already happened, also the lower tire bead are brought into engagement with the rim flange and a good fit of the tire beads is produced. At the same time, the inflation opening is separated from the air tank 6 and the pressure inside the inflation ring is reduced by the activation of an outlet valve, before the inflation ring 9c is withdrawn from the sidewall of the tire by further lowering of the supporting plate 13. When the supporting plate 13 is once again in its lower position, the conveying means 18 is raised into its conveying position above the supporting plate 13 and the wheel with the inflated tire is conveyed out of the tire inflating station 1. As shown in the drawing, the next wheel to be processed is already provided on the conveying means 17, so that it can be delivered to the processing position of the station while the wheel filled with air is conveyed away.

What is claimed is:

1. A tire inflating station for inflating a tubeless tire arranged on a rim with a pressurized gas, comprising:
   a stand;
   a conveyor arranged on the stand for receiving and further conveying a wheel consisting of a wheel rim and a tire mounted on the wheel rim;
   an inflation device arranged above the conveyor and having an inflation opening connectable to a gas supply and at least two inflation rings of different diameters from each other and which are configured to engage in a sealing manner with an upper side face of a tire of a wheel arranged lying under the inflation device; and
   a bearing having a sealing surface which cooperates with a lower side face of the tire and on which the wheel rests during inflation;
   wherein the inflation device comprises on its lower side a carrier plate which is mounted such that said carrier plate can move backwards and forwards along an axis between at least two working positions in a straight-line mechanism, the inflation rings, seen in a direction of movement of the carrier plate, being attached in tandem in a gas-tight manner on the lower side of the carrier plate,
   wherein the carrier plate has a respective continuous opening inside each of the inflation rings, and wherein, in each of the at least two working positions of the carrier plate, one of the continuous openings is connected to the inflation opening of the inflation device, said inflation opening being arranged on an upper side of the carrier plate.

2. The tire inflating station according to claim 1, wherein the carrier plate is movable in a conveying direction of the conveying means.

3. The tire inflating station according to claim 1, wherein the inflation device is rigidly connected to the stand and the bearing is movable up to the inflation device.

4. The tire inflating station according to claim 1, wherein the carrier plate is supported with its upper side on a top plate which is attached to the stand and which supports the inflation device.

5. The tire inflating station according to claim 3, wherein a plurality of pneumatic lifting cylinders are arranged on the stand, said lifting cylinders being adapted to move the bearing in a direction perpendicular to the sealing surface, and wherein a hydraulically lockable brake cylinder is arranged on the bearing, by which the bearing can be secured in a respective working position.

6. The tire inflating station according to claim 1, wherein the bearing has a supporting plate with a planar supporting surface that forms at least a first part of the sealing surface.

7. The tire inflating station according to claim 6, wherein the conveyor has conveyor belts that are positioned in grooves in an upper side of the supporting plate when the bearing is moved up to the inflation device, and wherein the conveyor belts are positioned in the grooves and tightly seal the grooves and form with their upper side a second part of the sealing surface.

8. The tire inflating station according to claim 7, wherein the conveyor belts are guided on both sides of the supporting plate by deflection rollers and wherein at least the deflection rollers on an inlet side of the conveyor are adapted to be moved transversely to the supporting surface of the supporting plate from a first position, in which the conveyor belts are positioned in the grooves in the upper side of the supporting plate, into a second position, in which the conveyor belts emerge at least partly from the grooves.

9. The tire inflating station according to claim 1, further comprising a centering device which is configured to center a wheel conveyed into the tire inflating station with respect to an axis of the inflation ring arranged in a working position.

10. A method for inflating a tubeless tire arranged on a rim with a pressurized gas, using a tire inflating station comprising a stand, a conveyor arranged on the stand for receiving and further conveying a wheel consisting of a wheel rim and a tire mounted on the wheel rim, an inflation device which is arranged above the conveyor and has an inflation opening connectable to a gas supply, at least two inflation rings of different diameters which are configured to engage in a sealing manner with an upper side face of a tire of a wheel arranged lying under the inflation device, and a bearing which has a sealing surface that cooperates with a lower side face of the tire and on which the wheel rests during the inflation procedure, the method comprising:

attaching the at least two inflation rings gas-tight and in tandem to a lower side of a carrier plate;

movably mounting the carrier plate on a lower side of the inflation device such that the carrier plate is movable backwards and forwards along an axis between at least two positions;

conveying a wheel into the tire inflating station and positioning the wheel on the sealing surface of the bearing means;

moving the carrier plate for positioning one of the at least two inflation rings in a working position fitting the wheel and connecting one of the inflation rings to the inflation device;

moving the bearing means with the wheel lying on the sealing surface up to the carrier plate until the one inflation ring rests against an upper side wall of the tire;

pressing the tire to such an extent that an annular gap sufficiently large for inflation is formed between an upper tire bead and the rim;

inflating the tire with a pressurized gas supplied by the inflation device;

lowering the bearing means when an inflation pressure has been reached;

and conveying the wheel out of the tire inflating station.

* * * * *